United States Patent
Conklin

[11] 3,759,172
[45] Sept. 18, 1973

[54] BRANDING APPARATUS AND METHOD
[75] Inventor: Paul W. Conklin, Kansas City, Mo.
[73] Assignee: Addressograph-Multigraph Corporation, Cleveland, Ohio
[22] Filed: Feb. 28, 1972
[21] Appl. No.: 229,931

[52] U.S. Cl............ 101/9, 101/27, 101/32, 219/70
[51] Int. Cl............ B44b 5/00, B44b 7/02
[58] Field of Search............ 101/8, 9–11, 101/25, 27, 31, 32, 21; 156/380, 183, 290; 219/68–70

[56] References Cited
UNITED STATES PATENTS

| 2,458,871 | 1/1949 | Oles | 219/70 |
| 2,858,633 | 11/1958 | Kane | 101/27 |
| 3,515,059 | 6/1970 | Sciame | 101/27 X |
| 3,304,856 | 2/1967 | Birch | 101/27 |
| 1,865,610 | 7/1932 | Blair | 101/26 |
| 1,928,067 | 9/1933 | Martoccio | 101/9 X |
| 3,461,567 | 8/1969 | Villers | 101/27 X |
| 2,539,874 | 1/1951 | Stockfleth | 101/27 X |
| 2,844,094 | 7/1958 | Gruver | 101/27 X |
| 3,550,153 | 12/1970 | Haeberle | 101/1 X |
| 3,316,835 | 5/1967 | Liepett | 101/27 |

Primary Examiner—Robert E. Pulfrey
Assistant Examiner—E. M. Coven
Attorney—Russel L. Root et al.

[57] ABSTRACT

Indicia such as a vehicle identification number or unit serial number is electrically branded on a metal workpiece such as an automobile by a metal strip with embossed indicia. Electrical current from a welding current supply source is passed through the metal strip with the indicia in contact with the workpiece and this electrically brands the indicia onto the workpiece. The foregoing abstract is merely a resume of one general application, is not a complete discussion of all principles of operation or applications, and is not to be construed as a limitation on the scope of the claimed subject matter.

10 Claims, 12 Drawing Figures

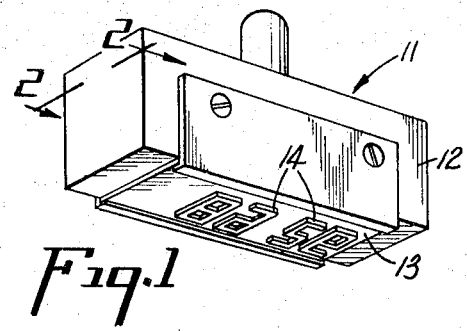
Fig.1
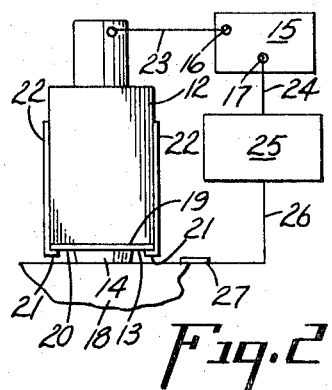
Fig.2
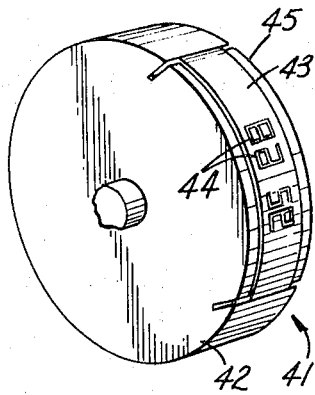
Fig.4
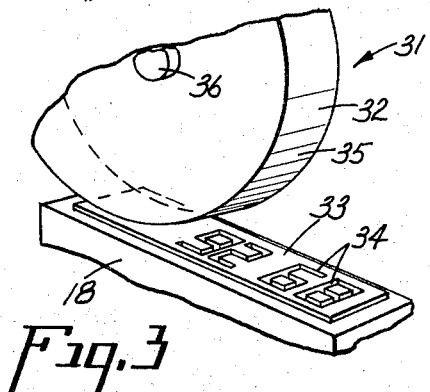
Fig.3
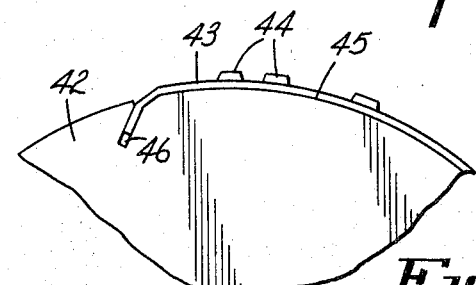
Fig.5
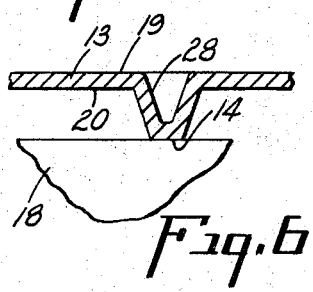
Fig.6
Fig.9
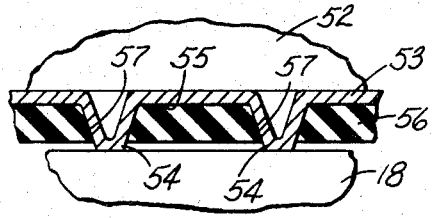
Fig.7
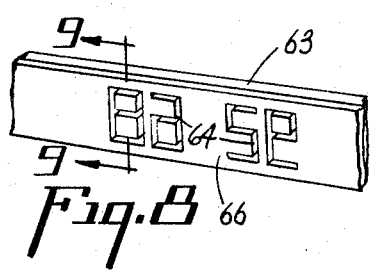
Fig.8
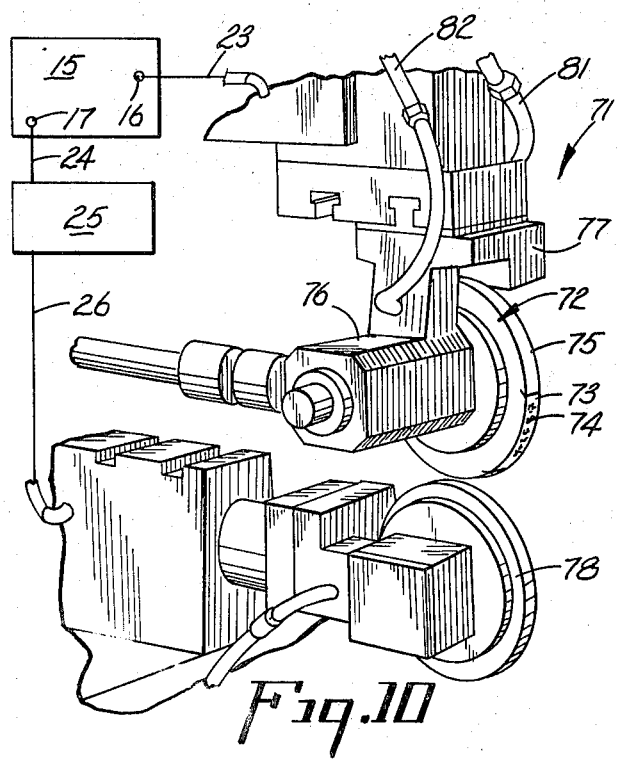
Fig.10

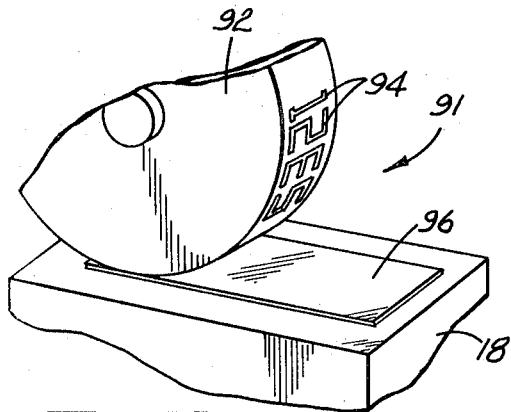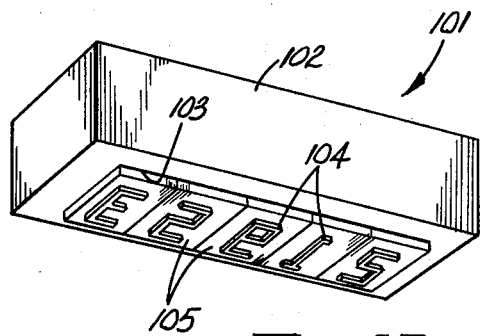

BRANDING APPARATUS AND METHOD

BACKGROUND OF THE INVENTION

The branding of a material as disclosed in the present application might be better understood through a discussion of the principles of welding. Although branding involves only one article and no fusing of materials, the theory is identical. The basis upon which the electrical welding principle operates can be attributed to the extreme differences in material resistances. In both a welding environment or branding as shown by the embodiments of this application, a workpiece or workpieces are placed, in contact, between two electrodes. A current is then caused to flow from one electrode, through the workpieces and into the other electrode.

The electrodes of the welder or branding device are designed to be a very low resistance material, i.e., highly conductive electrically. The workpieces, on the other hand, have a relatively lower conductivity, electrically. Therefore, electrical current will pass through the electrodes with relatively little resistance and thus only minimal heat build up. However, current passing through the workpiece encounters much resistance and therefore develops a large amount of heat. This heat build up causes localized melting of the workpiece at the point of electrode contact.

In a welding arrangement, the localized melting of more than one workpiece between the electrodes will result in the workpieces fusing together. Where only one workpiece is present, as in branding, the electrodes which are held in contact with the workpiece cause the melted material to conform to the surface of the electrodes.

The value of the current to be supplied depends upon the type of material to be branded. For a very thin material, the current required could be quite small. Conversely, the current required to brand an article of massive thickness may be extensively large. Such an extreme difference in current values makes the establishment of a range impractical. Even to establish a minimum value would be difficult due to the multitude of materials possible to mark.

The theory behind passing an electrical current between electrodes and through a workpiece is evident from the state of the art in welding.

Due to the discussion above in regard to minimum current values and the face that tables in references dealing with welding contain the necessary information, the inclusion of this type of information in the specification is not felt to be critical to comprehension of the invention.

Automobile serial numbers have been used for decades on engines and the body or frame. The time-honored method of marking the unit serial number on such vehicle has been by means of a die punch hit with a hammer to punch the numeral, digit by digit into the softer metal of the engine or body. This impact method is expensive in manual labor costs and there is always the chance for human error in selecting the wrong digits or the wrong order of such digits. Such error results in much more cost. An improved method is now being used wherein a die holder is made up and then the entire die set is struck with a hammer to place the unit serial number on the automobile.

Hot stamping presses are used for attaching gold foil letters, for example, on material such as leather or plastic. Such systems are raised indicia on a heated platen to press against a leather workpiece with the gold foil therebetween. When removed, this leaves the gold letter indicia on the leather workpiece, although it is not permanent because it can be abraded off and it does not mark the workpiece much below the surface.

Heat shrinkable films have been marked with heated raised indicia to deform the film and place indicia thereon such as a coded date. This is a form of branding but there has been no suggestion that it could be used with metal workpieces.

The U.S. Government has become increasingly concerned with the rising vehicle theft rate throughout the U.S. and is suggesting that the vehicle identification number or unit serial number be placed on as many as fifteen locations throughout the vehicle to include transmissions and carburetors. To put this many numbers on a vehicle by the impact method would be even more expensive than today's procedure. Also some components such as carburetors are made from die cast metal which is frangible and will not withstand the hammer blow on a die set.

Accordingly, an object of the invention is to obviate the above-mentioned disadvantages.

Another object of the invention is to electrically brand indicia such as a vehicle identification number onto metallic parts of an automobile.

Another object of the invention is to electrically brand from a welding current source indicia embossed on a metal strip onto a conducting workpiece.

Another object of the invention is to brand a conductive workpiece to a considerable depth so that it may not be removed even by grinding away one-eighth of an inch and more of the conducting workpiece.

Another object of the invention is to provide an electrical branding method and apparatus which changes the metallic structure of the metal workpiece to a depth of at least one-eight inch.

SUMMARY OF THE INVENTION

The invention may be incorporated in a branding apparatus to operate on a workpiece, comprising in combination, a base, electrically conductive indicia areas on said based adapted to be placed adjacent a workpiece, terminals adapted to be connected to electrical current supply means, and means to pass current from said supply means terminals between said base indicia areas and a workpiece to brand by such current a mirror image of said indicia areas on the workpiece.

Other objects and a fuller understanding of the invention may be had by referring to the following description and claims, taken in conjunction with the accompanying drawings.

BRIEF DESCRIPTION OF THE DRAWINGS

FIG. 1 is an isometric view of an electrode fixture and indicia used with the branding apparatus of the invention;

FIG. 2 is a view on line 2—2 of FIG. 1;

FIG. 3 is an isometric view of a modified form of an electrode fixture;

FIG. 4 is another modified form of electrode fixture;

FIG. 5 is a partial elevational view of the electrode fixture of FIG. 4;

FIG. 6 is an enlarged longitudinal section through the indicia base of an embossed strip used in the preferred embodiment of the invention;

FIG. 7 is an enlarged view similar to FIG. 6 of another modification;

FIG. 8 is an isometric view of a base carrying indicia or an alternate modification to that of FIG. 6;

FIG. 9 is a sectional view on line 9—9 of FIG. 8;

FIG. 10 is a perspective view of a rolling electrode resistance welder schematically connected to an electrical current source;

FIG. 11 is a perspective view of another embodiment of the invention; and

FIG. 12 is a perspective view of still another embodiment of the invention.

DESCRIPTION OF THE PREFERRED EMBODIMENT

FIGS. 1 and 2 shows a first embodiment of the branding apparatus 11 of the invention. This branding apparatus includes generally an electrode fixture 12, a base 13, indicia 14, and an electrical current supply means or power supply 15. Terminals 16 and 17 of the power supply 15 are adapted to supply current to the different forms of electrode fixtures shown in the FIGS. 1 - 10 and to pass current between such electrode fixture and a workpiece 18. In FIGS. 1 and 2 the electrode fixture may be made from copper, for example, or other good electrical conductor. The base 13 is in the form of an electrically conductive strip, for example, a strip of electrolytic copper or beryllium copper. The controlling criteria for base 13 is that it will not weld to other metals.

Base 13 has a rear face 19 and a front face 20 with the indicia 14 on the front face 20. In this embodiment of FIGS. 1 and 2, the indicia 14 is an electrically conductive indicia formed by embossing various numerals or letters on the metal strip 13. These digits or letters forming a type face on the front face 20 are easily embossed into the soft copper of the strip 13 by an embossing machine, for example. This forms the indicia 14 as being wrong-reading on the strip, so that when the workpiece 18 is branded, it will be right-reading indicia on the workpiece. This is terminology from the printing art and the wrong-reading indicia 14 on the front face 20 is a left-to-right mirror image of the indicia desired on the workpiece 18.

In FIGS. 1 and 2 it will be noted that the rear face 19 of the metal strip 13 is in physical and electrical contact with a flat surface of the electrode fixture 12 and may be held in place by being slid lengthwise into position beneath the feet 21 of insulating strips 22 secured to the sides of the electrode fixture or holder 12.

FIG. 2 shows how the power supply 15 may be used with an electrode fixture such as the electrode fixture 12. The terminal 16 may be connected by a conductor 23 to the electrode fixture 12 and terminal 17 may be connected by a conductor 24, a control means 25, a conductor 26 and a workpiece clamp 27 to the workpiece 18. The control means 25 may be any suitable control such as a simple switch or a more sophisticated control which supplied impulses of current. The power supply 15 may be that suitable for resistance welding, for example, and may supply any suitable voltage to pass current between electrode fixture 12 and the workpiece 18.

Because the indicia 14 is raised out of the plane of the base or metal strip 13, only the front face, apex or outer surface of the indicia will engage the workpiece 18. When the control means 25 is actuated to supply welding current to the electrode fixture 12 and the workpiece then current will pass at those locations where the indicia is contacting or closely adjacent the workpiece 18. By this means electrical branding of the type face of the indicia is effected on the workpiece 18. The base or strip 13 is made from some material which does not weld to steel, cast-iron and aluminum workpieces. Beryllium copper or electrolytic copper strips 13 have been found quite satisfactory.

FIG. 3 shows another modification of the invention in a branding apparatus 31 utilizing an electrode fixture 32. This electrode fixture has a curved face 35, as a circular arc from an axis 36 about which the fixture 32 is adapted to rotate. Fixture 31 is adapted to be used with a base 33 having indicia 34. Again the base 33 may be a conductive strip, for example, a copper strip from which the indicia 34 is embossed or otherwise raised on the front face thereof which engages the workpiece 18. The rear face of the base or metal strip 33 has rolling engagement with the curved face 35 of the electrode fixture 32.

FIGS. 4 and 5 show another modification of the invention in a branding apparatus 41 with an electrode fixture 42 and a base or metal strip 43 having indicia 44 thereon. Electrode fixture 42 has a curved face 45 adapted for electrical and physical contact with the rear face of the base 43. FIG. 5 shows an enlarged detail of mounting the base 43 on the electrode fixture 42. This may be simply done by angled slots 46 to receive the opposite ends of the metal strip 43. This temporarily secures the strip to the electrode fixture 42. The fixture rotates in the same manner as diagrammatically illustrated in FIG. 3, and current is passed between the fixture and workpiece. The mirror image indicia will brand the desired indicia in sequence on the workpiece.

FIG. 6 shows an enlarged view of a preferred form of the metal strip or base 13. Such strip is deeply embossed as at 28 by a die set or embossing machine to form raised letters, numerals or other indicia 14 with a chisel point apex to engagingly contact the workpiece 18. Embossing is believed to be preferable over cast pieces with solid indicia. The base or metal strip 13 may be of any suitable thickness, but for best results of embossing and to provide sufficient work life, should be in the order of 0.005 to 0.050 inches thick. A suitable thickness has been found to be 0.010 inches thick. The embossing or raising of the indicia 14 away from the front face 20 of the strip 13 may also be of any suitable height. Typical metal embossing of letters on metal plates for the printing art is in the order of twenty-twenty five thousandths of an inch with a curved apex. Better results have been found to be achieved by indicia areas with a chisel point or flat apex rather than a curved apex and the preferred height of such embossing is 0.050 inches. This assures that the electrical current flows only at the apex of the indicia and does not arc over between the front face 20 of the metal strip 13 and the workpiece 18 at places other than the indicia areas.

FIG. 7 shows another embodiment of base or metal strip 53 usable with any form of electrode fixture 52. This base 53 has indicia 54 which may not be embossed as deeply as the indicia shown in FIG. 6. Means to inhibit current flow between the front face 55 of the base 53 and the workpiece 18 includes insulation material 56 which has apertures 57 at the locations of the indicia 54. This insulation helps assure that the current flow for the branding of the workpiece 18 will occur only at the indicia 54 and not at other locations on the front face 55.

FIGS. 8 and 9 show a still further modification of a base or metal strip 63 having indicia 64. In this case the indicia is formed by apertures 65 in an insulating strip 66 secured on the front face 67 of the base 63. Any suitable electrode fixture may contact the rear face of the base 63 to establish current flow to a workpiece contacting the front face of the insulating strip 66. The insulating strip 66 is of suitable thickness and dielectric constant to withstand the applied voltage and allow arcing or passage of welding or branding current only at the indicia apertures 65 so that a mirror image of the indicia 64 is formed on the workpiece. The insulating strip 66 thus inhibits the flow of current so that current flow is only at the indicia 64.

FIG. 10 illustrates a branding apparatus 71 with an electrode fixture 72, a base 73 and indicia 74. The electrode fixture 72 may be similar to that shown in FIGS. 4 and 5 with a curved face 75 on which is mounted the base 73. The electrode fixture 72 is shown mounted on a gear box 76 and a hanger 77 so that driving of the gear box 76 will cause rolling contact of the indicia 74 sequentially with a workpiece supported by a mating roller electrode 78. During this sequential contacting of the indicia the power supply 15 will supply branding current which will pass to the workpiece sequentially along the length or row of the indicia 74. The electrode fixture 72 may be made hollow so that a coolant fluid may be supplied through a supply conduit 81 and exit through an exit conduit 82. This cooling fluid helps keep the fixture 72 and base 73 cool during the flow of the branding current, and also between branding operations.

FIG. 11 illustrates a branding apparatus 91 with an electrode fixture 92 which may be similar to that in FIG. 4, for example. Indicia 94 is present on the electrode fixture 92 in any suitable manner. The electrode fixture 92 cooperates with a workpiece 18 to brand indicia thereon. Electrically conductive means 96 is interposed between the indicia areas 94 and the workpiece 18. In this preferred embodiment the electrically conductive means 96 is in the form of conductive metal foil and is between and in contact with the indicia and the workpiece. The indicia 94 is again made from some material which does not adhere to the foil 96. During passage of current, the foil is caused to adhere to the workpiece 18. In the preferred embodiment the passage of current actually deposits weld metal of the foil onto the workpiece. After the branding of the indicia, the remaining parts of the foil 96 may be brushed off if desired.

The embodiment of FIG. 11 has several advantages. The metal foil may be a zinc strip, for example, so that the deposited weld metal places a protective coating on the workpiece to inhibit corrosion. The workpiece might be sheet metal roof or side wall panels of a prefabricated building, for example, which is previously galvanized with a zinc coating. Branding and depositing additional zinc permits additional corrosion protection. Where the branding apparatus and method is used with a deposited conductive metal which is a different color from the surrounding area, then this aids ready visual metal foil may be tinted gold in color by addition of copper metal to have a different visual appearance from a silver-coated metal workpiece. Conversely a silver colored indicia on a copper colored workpiece will aid ready identification.

FIG. 12 shows branding apparatus 101 which includes an electrode fixture 102, which is in the form of a chase holder 103. Removable type 105 fits inside the chase holder recess 103 and has the indicia 104 on the outer face thereof. The type bars or at least the outer face thereof may be made of a metal which does not weld to the workpiece, for example, beryllium copper or electrolytic copper. This construction may be used in an electrode fixture with a curved face as in FIGS. 3, 4 and 5, if desired.

The various branding apparatuses disclosed herein are suitable for electrically branding indicia on a conducting workpiece. This is especially suitable in high volume use such as applying a vehicle identification number or unit serial number to vehicles. This includes the automobile engine of cast iron, the body or frame of sheet steel, the transmission housing of sheet steel, cast-iron or cast aluminum, and the carburetor which may be made of frangible die metal. Also the copper strips used as the bases 13, 33, 43, 53 or 63 may be used as often as twenty or thirty times, which will enable the automobile manufacturers to apply such indicia to 10 to 15 different locations on the automobile. This will permit hidden numbers, that is, hidden after the automobile is completely assembled, to aid in ready identification of stolen vehicles. Many other metal branding uses have been developed, and the same plate may be caused to heat by prolonged contact against a ground, and then impressed upon the vehicle tires to provide a vehicle related number.

It also has been observed that the electrical branding of this indicia makes a definite change to the metal of the workpiece for a considerable depth. This depth is at least one-eighth of an inch. After the indicia has been branded on the metal workpiece, the metal may be ground down to grind away one-eighth of an inch of metal and then when heat or acid etch is applied, the indicia reappears because of the changed structure of the metal workpiece. This is exceedingly advantageous in the U.S. Government's attempt to halt or deter those who would steal motor vehicles and attempt to alter the indicia on such vehicles.

It has been found that a 75KVA welding supply source is satisfactory for the power supply 15 and this may be a power supply such as is customarily used in resistance welders for spot welding or seam welding. Such capacity is suitable for iron or steel workpieces whereas a 150 KVA source has been found more suitable to aluminum workpieces.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A branding apparatus to operate on an electrically conductive workpiece, comprising, in combination, an electrically conductive metal strip having a rear face and a front face;

electrically conductive raised indicia areas formed on the front face of said base;

an electrical current supply means having terminals connected thereto;

and means to pass current from said supply means terminals between said base indicia areas and a workpiece when positioned to be in contact to brand by such current a mirror image of said indicia areas on the workpiece.

2. A branding apparatus as set forth in claim 1, wherein said base is a conductive strip of electrolytic copper.

3. A branding apparatus as set forth in claim 1, including an electrode fixture with a curved face;

and means temporarily placing said base adjacent to one of said electrode fixture and the workpiece;

whereby, said curved face is rolled relative to the workpiece to pass current between said base and the workpiece sequentially along the length of the indicia areas.

4. A branding apparatus as set forth in claim 1 wherein said base is a conductive strip of beryllium copper.

5. The method of using indicia to mark a workpiece, comprising the steps of;

selecting a material which will not spot weld to said workpiece;

establishing a desired indicia as an electrically conductive raised type face on a segment of said material;

placing at least part of said type face in contact with an electrically conductive workpiece to be marked;

and passing electrical current between said type face and the workpiece to brand indicia on the workpiece in accordance with the selected indicia.

6. The method as set forth in claim 5, including inhibiting the flow of electrical current between the workpiece and said base at locations other than at said type face.

7. The method as set forth in claim 5, wherein the base of said conductive type face is an embossed thin strip of metal.

8. The method as set forth in claim 7, wherein said thin strip of metal is formed of electrolytic copper.

9. The method as set forth in claim 5, including forming an electrode holder with a curved face, placing said base between the electrode holder and a workpiece;

and rolling the electrode holder relative to the workpiece as the electrical current is passing therebetween to sequentially brand indicia on the workpiece.

10. A method used as set forth in claim 7, wherein said thin strip of metal is formed of beryllium copper.

* * * * *